United States Patent [19]

Inata et al.

[11] 4,115,362
[45] Sep. 19, 1978

[54] PROCESS FOR PREPARING POLYESTERS

[75] Inventors: Hiroo Inata; Shoji Kawase, both of Iwakuni, Japan

[73] Assignee: Teijin Limited, Osaka, Japan

[21] Appl. No.: 784,628

[22] Filed: Apr. 4, 1977

Related U.S. Application Data

[63] Continuation-in-part of Ser. No. 619,495, Oct. 3, 1975, abandoned.

[51] Int. Cl.$^2$ ............... C08G 63/18; C08G 63/22
[52] U.S. Cl. .................. 528/190; 528/193; 528/173; 528/180; 528/181
[58] Field of Search ............................. 260/47 C

[56] References Cited

U.S. PATENT DOCUMENTS

| | | | |
|---|---|---|---|
| 3,399,170 | 8/1968 | Blaschke et al. | 260/47 |
| 3,413,379 | 11/1968 | Schade et al. | 260/47 |
| 3,560,439 | 2/1971 | Price et al. | 260/47 |
| 3,772,405 | 11/1973 | Hamb | 260/860 |

*Primary Examiner*—Lester L. Lee
*Attorney, Agent, or Firm*—Wenderoth, Lind & Ponack

[57] ABSTRACT

A process for preparing polyesters which comprises (1) a first step of esterifying (A) a difunctional carboxylic acid containing at least 60 mole% of an aromatic dicarboxylic acid, (B) 0 to 80 mole%, based on component (A), of an aliphatic diol and (C) an aromatic monohydroxy compound in an amount of at least 210 mole% as a total of it and component (B) based on component (A), the esterification being performed until the degree of esterification reaches 80 to 98%, and (2) a second step of adding 0 to 80 mole%, based on component (A), of component (B), and an aromatic dihydroxy compound (D) in an amount of 95 to 130 mole% as a total of it and component (B) based on component (A), to the reaction product obtained in the first step and reacting the mixture, the total amount of components (B) used in the first and second steps being 0 to 80 mole% based on component (A).

9 Claims, No Drawings

PROCESS FOR PREPARING POLYESTERS

This application is a continuation-in-part application of copending U.S. Ser. No. 619,495 filed on Oct. 3, 1975, now abandoned.

The invention relates to a process for preparing polyesters, and more specifically, to an improved process for preparing polyesters having superior thermal stability, transparency and chemical resistance.

Polyethylene terephthalate has gained widespread industrial use because of its superior mechanical properties or chemical resistance, but possesses unsatisfactory dimensional stability and transparency because its heat distortion temperature is relatively low, and its rate of crystallization is fast.

In an attempt to remove these defects, methods have been suggested heretofore to polycondense aromatic dicarboxylic acid derivatives and aromatic dihydroxy compounds. For example, these methods include (a) a method wherein an aromatic dicarboxylic acid chloride is reacted with an aromatic dihydroxy compound in solution, (b) a method wherein a diaryl ester of an aromatic dicarboxylic acid is melt-polymerized with an aromatic dihydroxy compound, and (c) a method comprising reacting an aromatic dicarboxylic acid, an aromatic dihydroxy compound and a diaryl carbonate.

The method (a) requires extra steps such as the removal of the reaction solvent and the purification of the product, and because of many production steps involved, it suffers from low productivity. The methods (b) and (c) are commercially disadvantageous since they require expensive materials such as the diaryl ester of aromatic dicarboxylic acid or the diaryl carbonate.

Accordingly, it is an object of this invention to provide a practical process which can overcome the difficulties of the prior art methods, and can easily afford polyesters using aromatic dicarboxylic acids and aromatic diols.

Another object of this invention is to provide a process which can advantageously afford polyesters having superior thermal stability, transparency and chemical resistance.

These objects can be achieved by a process for preparing polyesters in accordance with this invention which comprises a first step of reacting (A) a difunctional carboxylic acid containing at least 60 mole% of an aromatic dicarboxylic acid, (B) 0 to 80 mole%, based on component (A), of an aliphatic diol and (C) an aromatic monohydroxy compound selected from the group consisting of phenol, cresol and naphthol, the total amount of components (B) and (C) used in the first step being at least 210 mole% based on component (A), the reaction being carried out in the presence of a catalyst and at a temperature of 200° to 350° C. until the degree of esterification reaches 80 to 98%, and a second step of adding to the reaction product of the first step 0 to 80 mole%, based on component (A), of component (B), and (D) an aromatic dihydroxy compound, the total amount of components (B) and (D) used in the second step being 95 to 130 mole% based on component (A), and reacting the resultant mixture at a temperature of 200° to 350° C., the total amount of component (B) used in the first and second steps being 0 to 80 mole% based on component (A).

Examples of the aromatic dicarboxylic acid used as component (A) in the present invention are terephthalic acid, isophthalic acid, 2-methylterephthalic acid, 4-methylisophthalic acid, naphthalenedicarboxylic acid, diphenyldicarboxylic acid, diphenyletherdicarboxylic acid, diphenylsulfonedicarboxylic acid, and diphenoxyethanedicarboxylic acid. They can be used either alone or in admixture of two or more. Of these, terephthalic acid, isophthalic acid, and naphthalenedicarboxylic acid are especially preferred. The component (A) may further contain a small proportion, usually, not more than 40 mole%, based on the entire acid component, of another difunctional carboxylic acid, for example, aliphatic dicarboxylic acids such as adipic acid or sebacic acid, alicyclic dicarboxylic acids such as hexahydroterephthalic acid or hexahydroisophthalic acid, and hydroxycarboxylic acids such as $\epsilon$-hydroxycaproic acid ($\epsilon$-caprolactone), or hydroxybenzoic acid.

Examples of the aliphatic diols used as component (B) in this invention include aliphatic diols such as ethylene glycol, propylene glycol, trimethylene glycol, tetramethylene glycol, neopentyl glycol or hexamethylene glycol, alicyclic-containing aliphatic diols such as cyclohexane dimethylol or tricyclodecane dimethylol, and aliphatic diols containing an aromatic ring in the molecule such as bis($\beta$-hydroxyethoxy) diphenylsulfone, 4,4'-bis($\beta$-hydroxyethoxy) diphenyl ether, 1,2-bis(4-$\beta$-hydroxyethoxyphenyl) ethane, 2,2-bis(4-$\beta$-hydroxyethoxyphenyl) propane, 1,1-bis(4-$\beta$-hydroxyethoxyphenyl) cyclohexane, or p-bis($\beta$-hydroxyethoxy) benzene. Of these, ethylene glycol, neopentyl glycol and cyclohexane dimethylol are especially preferred.

The aromatic monohydroxy compound used as component (C) in the present invention is a compound in which one hydroxyl group is directly bonded to an aromatic ring, and includes, for example, phenol, cresol, and naphthol. Of these, phenol is especially preferred.

The aromatic dihydroxy compound used as component (D) in the present invention is a compound in which two hydroxyl groups are directly bonded to an aromatic ring, and includes, for example, 2,2-bis(4-hydroxyphenyl) propane [bisphenol A], 1,1-bis(4-hydroxyphenyl) cyclohexane [bisphenol Z], 1,1-bis(4-hydroxyphenyl) ethane, bis(4-hydroxyphenyl) methane, 1,2-bis(4-hydroxyphenyl) ethane, bis(4-hydroxyphenyl) cyclohexylmethane, 3,3-bis(4-hydroxyphenyl) pentane, bis(4-hydroxyphenyl) ether, and 1,4-dihydroxybenzene. These compounds can be used either alone or in admixture of two or more. Of these, bisphenol A and bisphenol Z are especially preferred.

One novel aspect of this invention is that in the first step, the aromatic dicarboxylic acid as component (A), the aliphatic diol as component (B) and the aromatic monohydroxy compound as component (C) are reacted, and in the subsequent second step, the aromatic dihydroxy compound as component (D) is reacted with the reaction product of the first step.

According to another aspect of this invention, the component (B) can be used either in the second step or both in the first and second steps, and according to still another aspect, the use of component (B) can be omitted.

Surprisingly enough, it has been found in accordance with the present invention that the polyester-forming reaction in the second step subsequent to the esterification reaction in the first step proceeds without any trouble, and particularly, the presence of phenol does not adversely affect the reaction in the second step.

Furthermore, it is surprising that the presence of the aliphatic diol promotes the reactions, especially the esterification reaction in the first step.

When component (B) is used in the first step, its amount is not more than 80 mole%, preferably 5 to 80 mole%, more preferably 10 to 75 mole%, especially preferably 20 to 70 mole%, based on component (A). When component (B) is used in the second step, its amount is the same as when it is used in the first step. When component (B) is used both in the first and second steps, the total amount of components (B) used in these steps should be adjusted to the above range.

When the amount of component (B) is larger than 80 mole%, the resulting polymer has poor thermal stability.

The amount of the aromatic monohydroxy compound (C) is such that the total amount of it and the component (B) is at least 210 mole% based on the difunctional carboxylic acid (A). When the amount is less than 210 mole%, the rate of the reaction is slow. The amount is preferably at least 230 mole%, more preferably at least 250 mole%. The upper limit is about 1000 mole%.

The amount of the component (D) is 98 to 130 mole%, preferably 100 to 120 mole%, based on the difunctional carboxylic acid (A). When it is less than 98 mole% or more than 130 mole%, the rate of polymerization becomes slow.

In the first step of the process of this invention, the components (A), (B) and (C) or the components (A) and (C) are reacted until 80 to 98% of the carboxyl groups of component (A) react. Preferably, the reaction is carried out at a temperature of 200° to 350° C. (more preferably 230° to 320° C.) and a pressure of 1 to 15 Kg/cm² (absolute). In order to perform the reaction more effectively, water generated as a result of the reaction is distilled off out of the reaction system, and the pressure is adjusted according to variations in the partial pressures of the components (B) and (C) or the partial pressure of component (C), and the vapor pressure of water. Specific procedures available will become apparent from Examples to be given hereinbelow.

Preferably, a catalyst is used in the first-step reaction. Examples of the catalyst are elemental metals such as sodium, potassium, lithium, calcium, magnenium, barium, tin, strontium, zinc, iron, aluminum, cobalt, lead, nickel, titanium, manganese, antimony or arsenic, and compounds of these metals such as their oxides, hydrides, hydroxides, halides, inorganic acid salts, organic acid salts, complex salts, double salts, alcoholates, or phenolates. Of these, titanium compounds such as titanium tetrabutoxide, titanium oxalate or titanium oxide, tin compounds such as dibutyltin oxide, antimony compounds such as antimony trioxide, and lead compounds such as lead oxide are preferred. The amount of the catalyst is usually 0.001 to 5 mole% based on component (A).

The reaction in the first step is carried out until 80 to 98% of the carboxyl groups of component (A) react. When the conversion of the carboxyl groups is less than 80%, the reaction of the reaction product with component (D) to be added does not fully proceed, and polyesters having the desired properties cannot be obtained. The preferred conversion of the carboxyl groups (the degree of esterification) is at least 85, more preferably at least 90%. If the reaction in the first step is carried out until the reaction percentage exceeds 98%, such reaction consumes too much time and is not preferable.

Following the first step, component (D) or both components (D) and (B) are added to the reaction product of the first step, and the mixture is polycondensed (second step). Preferably, the polycondensation reaction is carried out at a temperature of 200° to 350° C. and a pressure of 760 to 0.001 mmHg. Usually, the reaction in the second step is carried out in the molten state. When the resulting polymer has a high melting point, it is preferred to subject it further to solid-phase polymerization.

In the process of this invention, additives such as catalysts, stabilizers or coloring agents generally used in the preparation of polyesters can be employed without any trouble.

According to this invention, polyesters having a high degree of polymerization, high thermal stability, and superior dimensional stability, transparency and chemical resistance can be prepared easily at low cost from aromatic dicarboxylic acids as a starting material.

The invention is illustrated in greater detail by the following Examples and Comparative Example.

In these examples, all parts are by weight. The various properties in these examples were measured by the following methods.

Reduced specific viscosity ($\eta/_{sp/c}$)

Measured at 35° C. using a mixed solvent consisting of phenol and tetrachloroethane in a weight ratio of 60:40 while maintaining the concentration (C) at 1.2 g/deciliter.

Carboxyl number

Measured in accordance with the Conix's method (Macro. Molecular. Chem., 26, 226, 1958).

Heat distortion temperature

Measured in accordance with ASTM D-648.

Degree of esterification in the first step

Calculated in accordance with the following equation.

$$\text{Degree of esterification} = \frac{10^6 - \{(M_B - 2M_C) \cdot B + M_A\} \cdot (1/2) \cdot CV}{10^6 + (M_C - 18) \cdot CV} \times 100$$

wherein $M_A$, $M_B$ and $M_C$ are the molecular weights of components (A), (B) and (C) respectively (when any one of these components is a mixture of two or more compounds, its molecular weight is an average molecular weight of these components), B is the molar ratio of component (B) to component (A) at the time of feeding the starting components, and CV is the carboxyl number of the reaction product measured after removing excess component (C) from it.

EXAMPLE 1

An autoclave equipped with a rectification column and a stirrer was charged with 83.0 parts of terephthalic acid, 83.0 parts of isophthalic acid, 376 parts of phenol and 0.10 part of titanium tetrabutoxide, and purged with nitrogen. The mixture was heated to 285° C. while the pressure of nitrogen was adjusted so that the absolute pressure of the reaction system was maintained at 7.0 Kg/cm². In 15 minutes, the distillation of water began. The reaction was performed further for 200 minutes while the absolute pressure was gradually reduced down to 5.5 Kg./cm². During this time, about 30 parts of water was distilled off. A part of the reaction product was taken out, and after removing excess phenol, its carboxyl number was measured. It was found to be 735 eq/10⁶ g (the degree of esterification 89%).

The product was transferred to a reactor equipped with a stirrer, and 239.4 parts of bisphenol A was added. The mixture was reacted for 60 minutes at 280° C. under atmospheric pressure. Then, the pressure of the reaction system was reduced gradually, and in 30 minutes, it was reduced to about 0.5 mmHg (absolute). At this pressure, the reaction was further carried out for 150 minutes. The polymer obtained was transparent and had a reduced specific viscosity of 0.71.

The polymer was dried, and injection-molded at 290° C. The heat distortion temperature of the molded article was found to be 162° C.

When the reaction was continued for an additional 60 minutes in the reaction of the first step, a product having a degree of esterification of 94% was obtained.

EXAMPLE 2

The same autoclave as used in Example 1 was charged with 166 parts of terephthalic acid, 423 parts of phenol and 0.068 part of titanium tetrabutoxide, and purged with nitrogen. The mixture was heated to 290° C. and stirred, while maintaining the pressure of the reaction system at 7.5 Kg/cm² (absolute). While distilling out water generated as a result of the reaction out of the reaction system, the reaction was continued for 300 minutes while the pressure of the reaction system was gradually reduced down to 6.0 Kg/cm² by adjusting the nitrogen pressure. During this time, about 33 parts of water was distilled off. A part of the resulting product was taken out, and after removing excess phenol, its carboxyl number was measured. It was found to be 296 eq/10⁶ g (the degree of esterification 95%).

The reaction product was transferred to a reactor equipped with a stirrer, and 223.4 parts of bisphenol A and 10.4 parts of neopentyl glycol were added. The mixture was reacted for 60 minutes at 280° C. under atmospheric pressure. Then, the pressure of the reaction system was gradually reduced, and in 30 minutes, to about 0.5 mmHg. At this pressure, the reaction was further carried out for 30 minutes. During this time, the reaction product solidified. It was taken out, pulverized, and then subjected to solid-phase polymerization at 280° C. and about 0.5 mmHg (absolute) for 240 minutes. The resulting polymer had a reduced specific viscosity of 0.96. The polymer was dried, and injection-molded at 360° C. The molded article was found to have a heat distortion temperature of 160° C.

EXAMPLE 3

An autoclave equipped with a rectification column and a stirrer was charged with 166 parts of terephthalic acid, 338 parts of phenol and 0.199 part of stannous acetate, and purged with nitrogen. The mixture was heated to 285° C. while maintaining the pressure of the reaction system at 8.0 Kg/cm² (absolute) by adjusting the nitrogen pressure. After the distillation of water began, while reducing the pressure of the reaction system gradually down to 5.0 Kg/cm² (absolute), the reaction was performed for 470 minutes. During this time, about 33 parts of water was distilled off. A part of the reaction product was taken out, and after removing excess phenol, its carboxyl number was measured. It was found to be 389 eq/10⁶ g (the degree of esterification 94%).

The product was then transferred to a reactor equipped with a stirrer, and 114 parts of bisphenol A and 57.2 parts of neopentyl glycol were added. The mixture was reacted at 280° C. under atmospheric pressure for 60 minutes. Then, the pressure of the reaction system was reduced gradually, and in 30 minutes, to about 0.5 mmHg (absolute). At this pressure, the reaction was continued for an additional 180 minutes. The resulting polymer was transparent, and had a reduced specific viscosity of 0.76.

The polymer was dried, and then injection-molded at 260° C. The molded article was found to have a heat distortion temperature of 118° C.

EXAMPLE 4

The same autoclave as used in Example 3 was charged with 83.0 parts of terephthalic acid, 329 parts of phenol, 83.0 parts of isophthalic acid, 43.2 parts of cyclohexane dimethylol and 0.10 part of titanium tetrabutoxide, and purged with nitrogen. The mixture was heated to 280° C. and stirred, while maintaining the pressure of the reaction system at 8.0 Kg/cm² (absolute). While distilling off water formed as a result of the reaction out of the reaction system, and gradually reducing the pressure to 4.5 Kg/cm² (absolute) by adjusting the nitrogen pressure, the reaction was continued for 200 minutes. About 33 parts of water was distilled off. A part of the reaction product obtained was taken out, and after removing excess phenol, its carboxyl number was measured. It was found to be 245 eq/10⁶ g (the degree of esterification 96%).

The reaction product obtained was transferred to a reactor equipped with a stirrer, and 166.4 parts of bisphenol A was added. The mixture was reacted for 60 minutes at 280° C. under atmospheric pressure. Then, the pressure of the reaction system was gradually reduced, and in 30 minutes, to about 0.5 mmHg. At this pressure, the reaction was further carried out for 150 minutes. The resulting polymer had a reduced specific viscosity of 0.74. The polymer was dried, and injection-molded at 260° C. The molded article was found to have a heat distortion temperature of 142° C.

EXAMPLE 5

An autoclave equipped with a rectification column and a stirrer was charged with 166 parts of terephthalic acid, 57.2 parts of neopentyl glycol, 282 parts of phenol and 0.119 parts of stannous acetate, and purged with nitrogen. The mixture was heated to 285° C. while the nitrogen pressure was adjusted so that the pressure of the reaction system was maintained at 8.0 Kg/cm² (absolute). Fifteen minutes later, the distillation of water began. Further, the reaction was carried out for 250 minutes while gradually reducing the pressure down to 5.0 Kg/cm². During this time, about 34 parts of water was distilled off. A part of the resulting product was taken out, and after removing excess phenol, its carboxyl number was measured. It was found to be 124 eq/10⁶ g (the degree of esterification 98%).

The reaction product was then transferred to a reactor equipped with a stirrer, and 114 parts of bisphenol A was added. The mixture was reacted for 60 minutes at 280° C. under atmospheric pressure. Then, the pressure of the reaction system was gradually reduced, and in 30 minutes, to about 0.5 mmHg (absolute). At this pressure, the reaction was carried out further for 180 minutes. The resulting polymer was transparent, and had a reduced specific viscosity of 0.79.

The polymer was dried, and injection-molded at 260° C. The molded article was found to have a heat distortion temperature of 119° C.

COMPARATIVE EXAMPLE

The same esterification reaction in the first step as in Example 5 carried out except that the pressure of the reaction system at the initiation of the reaction was changed to 6.0 Kg/cm$^2$ (absolute), and the reaction time was changed to 120 minutes. About 24 parts of water was distilled off. The resulting product was found to have a carboxyl number of 1990 eq/10$^6$ g (the degree of esterification 72%).

Then, 114 parts of bisphenol A was added to the reaction product, and the mixture was reacted in the same way as in Example 5. The resulting polymer had a reduced specific viscosity of as low as 0.37.

EXAMPLE 6

The same autoclave as used in Example 5 was charged with 83.0 parts of terephthalic acid, 329 parts of phenol, 83.0 parts of isophthalic acid, 18.6 parts of ethylene glycol and 0.10 part of titanium tetrabutoxide, and purged with nitrogen. The mixture was heated to 280° C. and stirred while maintaining the pressure of the reaction system at 8.0 Kg/cm$^2$ (absolute). While distilling off water formed as a result of the reaction out of the reaction system and gradually reducing the pressure of the reaction system down to 4.5 Kg/cm$^2$ (absolute) by adjusting the nitrogen pressure, the reaction was continued for 200 minutes. About 33 parts of water was distilled off. A part of the resulting reaction product was taken out, and after removing excess phenol, its carboxyl number was measured. It was found to be 274 eq/10$^6$ g (the degree of esterification 96%.)

The resulting product was transferred to a reactor equipped with a stirrer, and 166.4 parts of bisphenol A was added. The mixture was reacted for 60 minutes at 280° C. under atmospheric pressure. Then, the pressure of the reaction system was gradually reduced, and in 30 minutes, to about 0.5 mmHg. At this pressure, the reaction was continued for an additional 150 minutes. The resulting polymer had a reduced specific viscosity of 0.71. The polymer was dried, and injection-molded at 260° C. The molded product was found to have a heat distortion temperature of 139° C.

EXAMPLE 7

The same autoclave as used in Example 5 was charged with 83.0 parts of terephthalic acid, 83.0 parts of isophthalic acid, 423 parts of phenol and 0.119 part of stannous acetate, and purged with nitrogen. While maintaining the pressure of the reaction system at 9.5 Kg/cm$^2$ (absolute), the mixture was heated to 290° C. and stirred. While distilling off water formed as a result of the reaction and gradually reducing the pressure of the reaction system to 5.7 Kg/cm$^2$ (absolute) by adjusting the nitrogen pressure, the reaction was continued for 250 minutes. During this time, about 33 parts of water was distilled off. A part of the reaction product was taken out and washed with water, and its carboxyl number was measured. It was found to be 376 eq/10$^6$ g (the degree of esterification 94%).

The resulting product was transferred to a reactor equipped with a stirrer, and 102.6 parts of bisphenol A and 37.2 parts of ethylene glycol were added. The mixture was reacted for 60 minutes at 280° C. under atmospheric pressure. Then, the pressure of the reaction system was gradually reduced, and in 30 minutes, to about 0.5 mmHg (absolute). At this pressure, the reaction was performed for an additional 180 minutes. The resulting polymer was transparent, and had a reduced specific viscosity of 0.77. The polymer was injection-molded at 270° C. The molded article was found to have a heat distortion temperature of 109° C.

EXAMPLE 8

An autoclave equipped with a rectification column and a stirrer was charged with 216 parts of 2,6-naphthalenedicarboxylic acid, 5.2 parts of neopentyl glycol, 376 parts of phenol and 0.1 part of titanium tetrabutoxide, and purged with nitrogen. Then, while maintaining the pressure of the reaction system at 7.5 Kg/cm$^2$ (absolute) by adjusting the nitrogen pressure, the mixture was heated to 280° C. After the distillation of water began, the pressure of the reaction system was gradually reduced down to 5.0 Kg/cm$^2$ (absolute), and the reaction was performed for 300 minutes. During this time, about 33 parts of water was distilled off. A part of the resulting product was taken out, and after removing excess phenol, its carboxyl number was measured. It was found to be 221 eq/10$^6$ g (the degree of esterification 96%).

The reaction product was transferred to a reactor equipped with a stirrer, and 228 parts of bisphenol A was added. The mixture was reacted for 60 minutes at 280° C. under atmospheric pressure. Then, the pressure of the reaction system was gradually reduced, and in 30 minutes, to about 0.5 mmHg (absolute). At this pressure, the reaction was performed for an additional 90 minutes. The resulting polymer was taken out, solidified, and pulverized.

The resulting granular polymer (about 10 mesh on a Tyler mesh sieve) was fed into a reactor, and subjected to solid-phase polymerization for 60 minutes at 260° C. and 0.5 mmHg (absolute), and then for 160 minutes at 300° C. The resulting polymer had a reduced specific viscosity of 1.25. The polymer was injection-molded at 370° C. The molded article was found to have a heat distortion temperature of 179° C.

EXAMPLE 9

An autoclave equipped with a rectification column and a stirrer was charged with 132.8 parts of terephthalic acid, 33.2 parts of isophthalic acid, 376 parts of phenol and 0.12 part of stannous acetate, and purged with nitrogen. While maintaining the pressure of the reaction system at 8.0 Kg/cm$^2$ (absolute) by adjusting the nitrogen pressure, the mixture was heated to 285° C. While distilling off water formed as a result of the reaction out of the reaction system and reducing the pressure of the reaction system down to 5.0 Kg/cm$^2$, the reaction was performed for 250 minutes. About 32 parts of water was distilled off. The reaction product was transferred to a three-necked reactor equipped with a stirrer, and excess phenol was removed. The reaction product was found to have a carboxyl number of 388 eq/10$^6$ g (the degree of esterification 94%).

Then, 237 parts of bisphenol A was added, and the mixture was reacted for 60 minutes at 280° C. under atmospheric pressure. Then, the pressure of the reaction system was gradually reduced, and in 30 minutes, to about 0.5 mmHg (absolute). At this pressure, the reaction was performed for an additional 40 minutes. The resulting polymer had a reduced specific viscosity of 0.21. Then, the polymer was heated at 230° C. for 2 hours to crystallize it. It was pulverized to a particle size of about 10 mesh, and subjected to solid-phase polymerization for 1 hour at 260° C. and about 0.5 mmHg and for 4 hours at 290° C. The resulting polymer had a reduced specific viscosity of 1.31, and an injection-molded article prepared from it was found to have a heat distortion temperature of 168° C.

EXAMPLE 10

(a) An autoclave with a rectification column and a stirrer was charged with 83.0 parts of terephthalic acid, 376 parts of phenol and 0.05 part of titanium tetrabutoxide, and purged with nitrogen. The mixture was heated to 285° C. while the pressure of nitrogen was adjusted so that the absolute pressure of the reaction system was maintained at 8.5 Kg/cm$^2$. In 15 minutes, the distillation of water began. The reaction was performed further for 285 minutes while the absolute pressure was gradually reduced down to 5.0 Kg/cm$^2$. During this time, about 16.6 parts of water was distilled off. A part of the reaction product was taken out, and after removing excess phenol, its carboxyl number was measured. It was found to be 320 eq/10$^6$ g (the degree of esterification 95%).

The product was transferred to a reactor equipped with a stirrer, and 93 parts of bisphenol A and 6.2 parts of ethylene glycol were added. The mixture was reacted for 60 minutes at 280° C. under atmospheric pressure. Then, the pressure of the reaction system was reduced gradually, and in 30 minutes, it was reduced to about 0.5 mmHg (absolute). At this pressure, the reaction was further carried out for 200 minutes. The polymer obtained was transparent and had a reduced specific viscosity of 0.78.

(b) As a comparison, when the reaction was continued for an additional 200 minutes in the reaction of the first step, a product having a degree of esterification of 99.5% was obtained.

This product was polymerized under the same condition as in the case of the second step of the abovesaid part (a), and a polymer having 0.81 of reduced specific viscosity was obtained.

What we claim is:

1. A process for preparing polyesters which comprises
    1. a first step of reacting (A) a difunctional carboxylic acid containing at least 60 mole% of an aromatic dicarboxylic acid, (B) 0 to 80 mole%, based on component (A), of an aliphatic diol and (C) an aromatic monohydroxy compound selected from the group consisting of phenol, cresol and naphthol, the total amount of components (B) and (C) used in the first step being at least 210 mole% based on component (A), the reaction being carried out in the presence of a catalyst and at a temperature of 200° to 350° C. until the degree of esterification reaches 80 to 98%, and
    2. subsequent to the first step, a second step of adding to the reaction product of the first step 0 to 80 mole%, based on component (A), of component (B), and (D) an aromatic dihydroxy compound, the total amount of components (B) and (D) used in the second step being 95 to 130 mole% based on component (A), and reacting the resultant mixture at a temperature of 200° to 350° C., the total amount of component (B) used in the first and second steps being 0 to 80 mole% based on component (A).

2. The process of claim 1 wherein component (B) is added only in the first step in an amount of 5 to 80 mole% based on component (A).

3. The process of claim 1 wherein component (B) is added only in the second step in an amount of 5 to 80 mole% based on component (A).

4. The process of claim 1 wherein component (B) is added both in the first and second steps in a total amount of 5 to 80 mole% based on component (A).

5. The process of claim 1 wherein the esterification reaction in the first step is carried out at a pressure of 1 to 15 Kg/cm$^2$ (absolute).

6. The process of claim 1 wherein component (A) is selected from the group consisting of terephthalic acid, isophthalic acid and 2,6-naphthalenedicarboxylic acid.

7. The process of claim 1 wherein component (B) is selected from the group consisting of ethylene glycol, neopentyl glycol and cyclohexane dimethylol.

8. The process of claim 1 wherein component (C) is phenol.

9. The process of claim 1 wherein component (D) is selected from the group consisting of 2,2-bis(4-hydroxyphenyl) propane and 1,1-bis(4-hydroxyphenyl)cyclohexane.

* * * * *